United States Patent [19]
Bergstrom et al.

[11] Patent Number: 5,907,614
[45] Date of Patent: *May 25, 1999

[54] HIGH DENSITY TELEPHONE NETWORK INTERFACE UNIT

[75] Inventors: Eric Paul Bergstrom, St. Charles; Richard A. Yndestad, Naperville; John A. Washburn, Aurora, all of Ill.

[73] Assignee: Teltrend Inc., St. Charles, Ill.

[*] Notice: This patent is subject to a terminal disclaimer.

[21] Appl. No.: 08/833,860

[22] Filed: Apr. 10, 1997

Related U.S. Application Data

[63] Continuation of application No. 08/649,303, May 17, 1996, Pat. No. 5,631,956.

[51] Int. Cl.$^6$ .................................................. H04M 19/00
[52] U.S. Cl. ........................ 379/399; 379/324; 379/413
[58] Field of Search .................................. 379/399, 324, 379/412, 413, 252, 253, 254

[56] References Cited

U.S. PATENT DOCUMENTS

| | | | |
|---|---|---|---|
| 5,521,977 | 5/1996 | Bergstrom et al. | 379/399 |
| 5,631,956 | 5/1997 | Bergstrom et al. | 379/399 |

OTHER PUBLICATIONS

"Wescom 3552–03 ESF T1 Network Interface Unit (ESF T1 NIU)," Section 355–203–201, Equipment Issue 1, First Printing, Mar. 1992.

"3140–01 High Density (HD) T1 Extension Repeater", Section 3140–01–10, Issue A, Westell, Inc., May 1991.

"Wescom 3552–00 ESF T1 Network Interface Unit (ESF T1 NIU)," Section 355–200–201, Equipment Issue 1, First Printing, Dec. 1990.

"Wescom 3552–01 ESF Network Interface Unit (NIU)," Section 355–201–201, Equipment Issue 1, Third Printing, Jun. 1990.

*Primary Examiner*—Ahmad F. Matar
*Assistant Examiner*—Jacques Saint-Surin
*Attorney, Agent, or Firm*—McDonnell Boehnen Hulbert & Berghoff

[57] ABSTRACT

An improved network interface unit having a substantially smaller width than many prior art network interface units. The network interface unit comprises a single, planar circuit board assembly interconnected between incoming and outgoing telephone lines and incoming and outgoing customer premises lines. Two relays and a controller are mounted on the board. The controller monitors the transmission of data along the lines and, by activating the relays, provides communication and maintenance functions, such as loopback. The network interface unit utilizes a controller made up of (1) a processor-based software control system and (2) an integrally cooperating application specific integrated circuit. The controller may, for example, provide and monitor framing, detect and monitor signals, and convert bipolar data to unipolar data.

25 Claims, 9 Drawing Sheets

Microfiche Appendix Included
(1 Microfiche, 46 Pages)

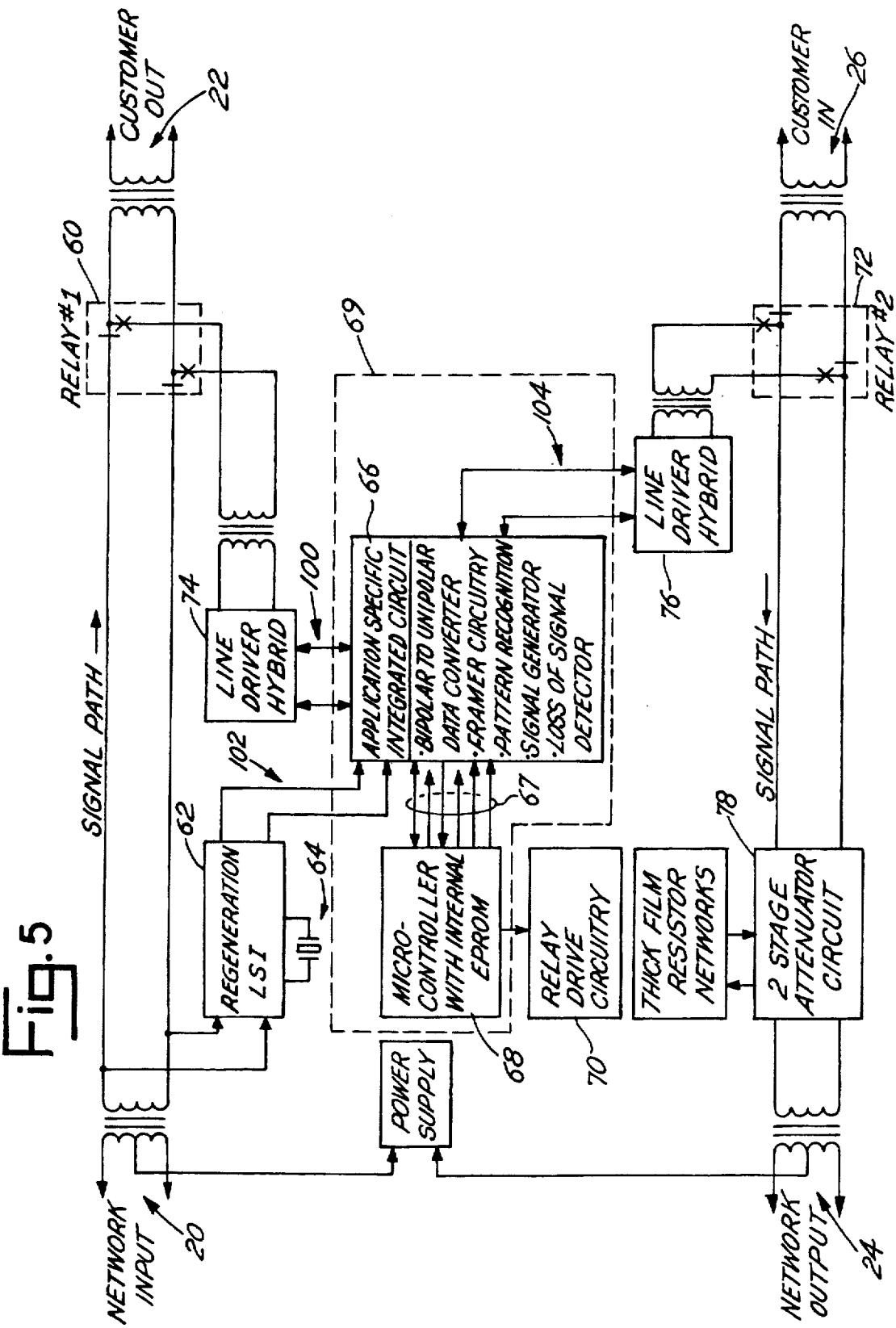

5,907,614

HIGH DENSITY TELEPHONE NETWORK INTERFACE UNIT

This is a continuation of application Ser. No. 08/649,303, filed May 17, 1996, now U.S. Pat. No. 5,631,956.

MICROFICHE APPENDIX

This application contains a microfiche appendix, which consists of one sheet of microfiche and a total of 46 frames.

COPYRIGHT

A portion of this disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

The present invention relates generally to telecommunication networks and, more particularly, to an improved high density digital network interface unit of reduced size, capable of communicating with remote transmission facilities.

Many telecommunication networks include a central office from which data, or "payload," signals may be transmitted over transmission lines to customer equipment on a customer's premises. Payload signals may comprise encoded analog or digital data.

Digital payload signals are typically sent over the transmission lines to a digital network interface ("DNI"), which is frequently referred to as a network interface unit ("NIU"). The NIU is located on the network side of the network interface, which is the point of demarcation between the local exchange carrier ("LEC") and the customer installation ("CI"). Where, for instance, the LEC is a local telephone company, the NIU would demarcate the point along the transmission lines where the telephone company's side of the telephone lines meets the customer's side of the telephone lines.

Electrically, the NIU is generally transparent to payload signals. However, NIU's have traditionally been used to provide special maintenance functions such as signal loopback. Signal loopback enhances carrier maintenance operation by allowing the LEC, such as the local telephone company, to remotely sectionalize problems along the transmission lines.

A channel bank receives signals from the NIU and converts the payload from digital signals to analog signals. The channel bank transmits an analog signal for each channel differentially on two wire conductors known as a Tip-Ring pair.

The Bell telephone system in the United States, for example, has widely utilized a digital time-domain multiplexing pulse code modulation system known as the T-1 transmission system. In the T-1 system, the data to be transmitted over the lines, such as speech, may be sampled at a rate of 8,000 hertz, and the amplitude of each sample is measured. The amplitude of each sample is compared to a scale of discrete values and assigned a numeric value. Each discrete value is then encoded into binary form. Representative binary pulses appear on the transmission lines.

The binary form of each sample pulse consists of a combination of seven pulses, or bits. An eighth bit is added to the end of the combination, or byte, to allow for signaling. Repetitively, each of the twenty-four channels on the T-1 system is sampled within a 125 microsecond period (equivalent to 1/8,000) of a second). This period is called a "frame." Since there are eight bits per channel and there are twenty-four channels, and there is one pulse at the end of each frame, the total number of "bits" needed per frame is 193. Thus, the resulting line bit rate for T-1 systems is 1.544 million bits per second.

Each frame of digital data is typically delimited by a "frame bit" (or "framing bit") or a series of frame bits. A frame bit serves as a flag, enabling line elements to distinguish the frame from the preceding frame or from noise on the line. In most framing protocols, whenever a receiving station detects the predetermined frame bit pattern, it knows that a new frame follows. If the frame bit does not occur in its proper position in the data stream, frame loss has occurred.

In the T-1 protocol, a coding system is used to convert analog signals to digital signals. The coding system guarantees some desired properties of the signal, regardless of the pattern to be transmitted. The most prevalent code in the United States is bipolar coding with an all-zero limitation (also called alternative mark inversion, or "AMI").

In bipolar coding, alternate one's (high bits) are transmitted as alternating positive and negative pulses, assuring a direct current balance and avoiding base-line wander. Contrasted with bipolar coding is unipolar coding, in which every occurrence of a high bit is seen as a positive pulse. In any coding scheme, a violation of predetermined coding rules generally constitutes an error.

Each T-1 transmission system carries 24 8-kB/second voice or data channels on two pairs of exchange grade cables. One pair of cables is provided for each direction of transmission. The T-1 transmission system is used in multiples "N", providing "N"-times-24 channels on "N"-times-two cable pairs. The cables exist in sections, called "spans," between and beyond a series of regenerative repeaters. A channel bank at each end of a span interfaces with both directions of transmission. Incoming analog signals are thus time-division multiplexed, digitized and transmitted. When the digital signal is received at the other end of the line, the incoming digital signal is decoded into an analog signal, demultiplexed and filtered in order to reconstruct the original signal.

Payload signals are received by the telephone company and are transmitted, via the first span of transmission lines, to alternating series of regenerative repeaters and to further transmission line. Regenerative repeaters are typically spaced every 6000 feet, connects span lines. Each repeater receives data from the previous repeater or from the central office but, because of transmission line losses, noise, interference and distortion, the signal will have degenerated. The repeater recognizes the presence or absence of a pulse at a particular point in time and, if appropriate, it regenerates, or "builds up," a clean new signal. The repeater then sends the regenerated signal along the next span of transmission line to the next repeater, stationed approximately one mile away.

The repeaters and span lines continue until the lines extend to the NIU. From the NIU, customer connections continue into customer premises.

In a T-1 transmission system, each span requires an NIU, and multiple spans are typically routed together. Therefore, multiple NIU's are usually placed together in the same physical location. Typically, network interface units are grouped together and mounted in a shelf, such as the Teltrend Rack-Mount Digital Shelf Assemblies Models DSA-120/A and DSA-111/A.

3

The telecommunications industry provides a standard for the dimensions of the above-discussed network interface units, the units often being referred to as "Type 400." According to the standard, a Type-400 NIU module is approximately 5.6 inches high, 5.9 inches long, and 1.4 inches wide. Accordingly, the telecommunications industry has also promulgated standards for the dimensions of a Type-400 mounting assembly (or shelf). According to the standard, each slot in an NIU mounting assembly is approximately 1.4 inches wide.

When additional customer interfaces or transmission lines are added to a network, it often becomes necessary to add additional network interface units in order to provide the required additional communication service. Unfortunately, the addition of Type-400 NIU modules has to date required additional shelf space. A need therefore exists for a digital network interface unit that will conserve existing shelf space while efficiently providing useful maintenance functions.

SUMMARY OF THE INVENTION

In a principal aspect, the present invention is an improved network interface unit having a substantially narrower width than existing network interface units, and, accordingly making more efficient use of shelf space. More particularly, the present invention provides a network interface unit comprising a single, planar circuit board assemble interconnected between incoming and outgoing telephone lines and incoming and outgoing customer premises lines. Two relays and a controller are mounted on the board. The controller monitors the transmission of data along the lines and, by activating the relays, provides communication and maintenance functions, such as loopback. The present invention utilizes a controller, made up of (1) a processor-based software control system and (2) an integrally cooperating application specific integrated circuit. The controller may, for example, provide and monitor framing, detect and monitor signals, and convert bipolar data to unipolar data.

Thus, an object of the present invention is a higher density network interface unit. A further object is a more compact network interface unit, substantially mounted on single, planar circuit board assembly, that allows a greater number of network interface units to be more easily housed in a shelf unit, or cabinet, of a particular size. These and other objects, features, and advantages of the present invention are discussed or apparent in the following detailed description.

BRIEF DESCRIPTION OF THE DRAWINGS

A preferred embodiment of the present invention is described herein with references to the drawing wherein:

FIG. 5 is a block diagram of a network interface unit made in accordance with the present invention;

4

Figure 8:
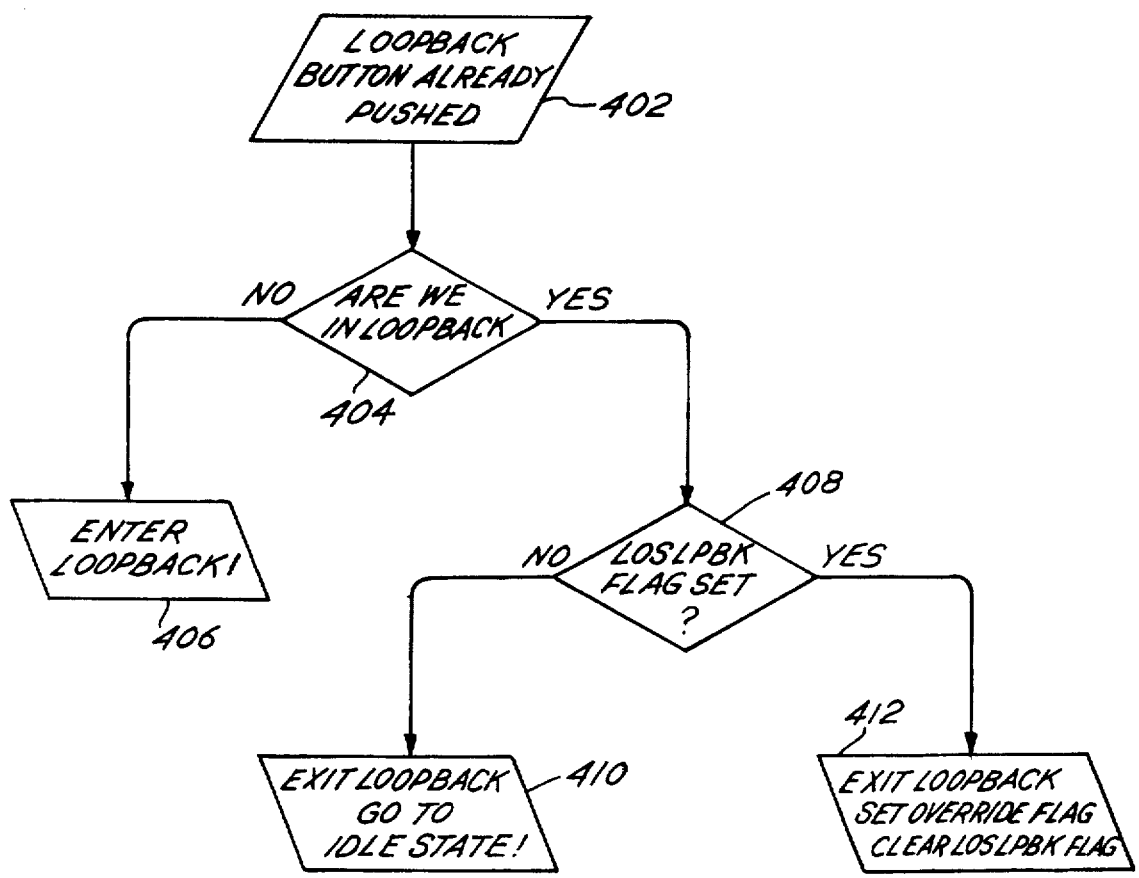
Figure 9:
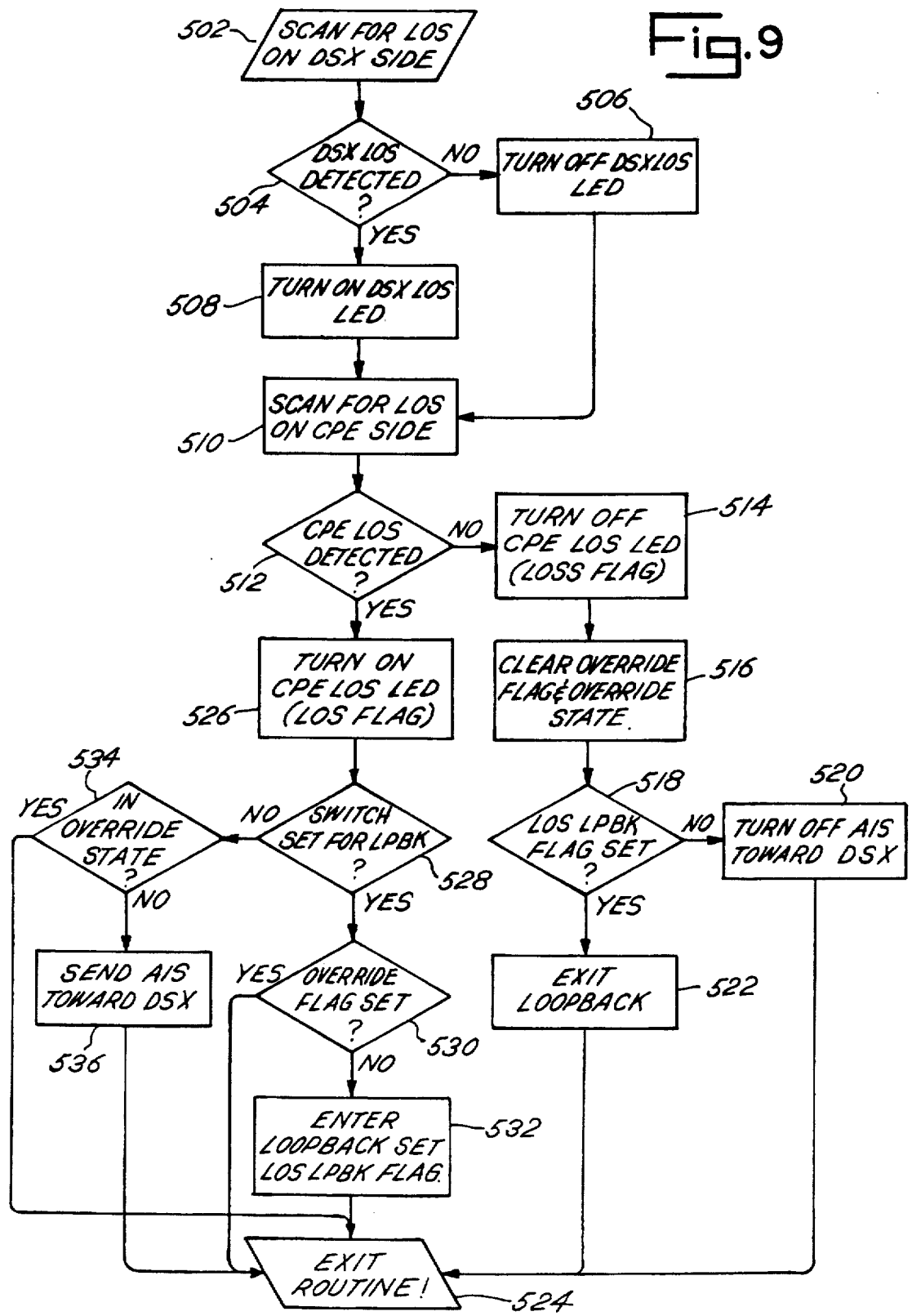
Figure 10:
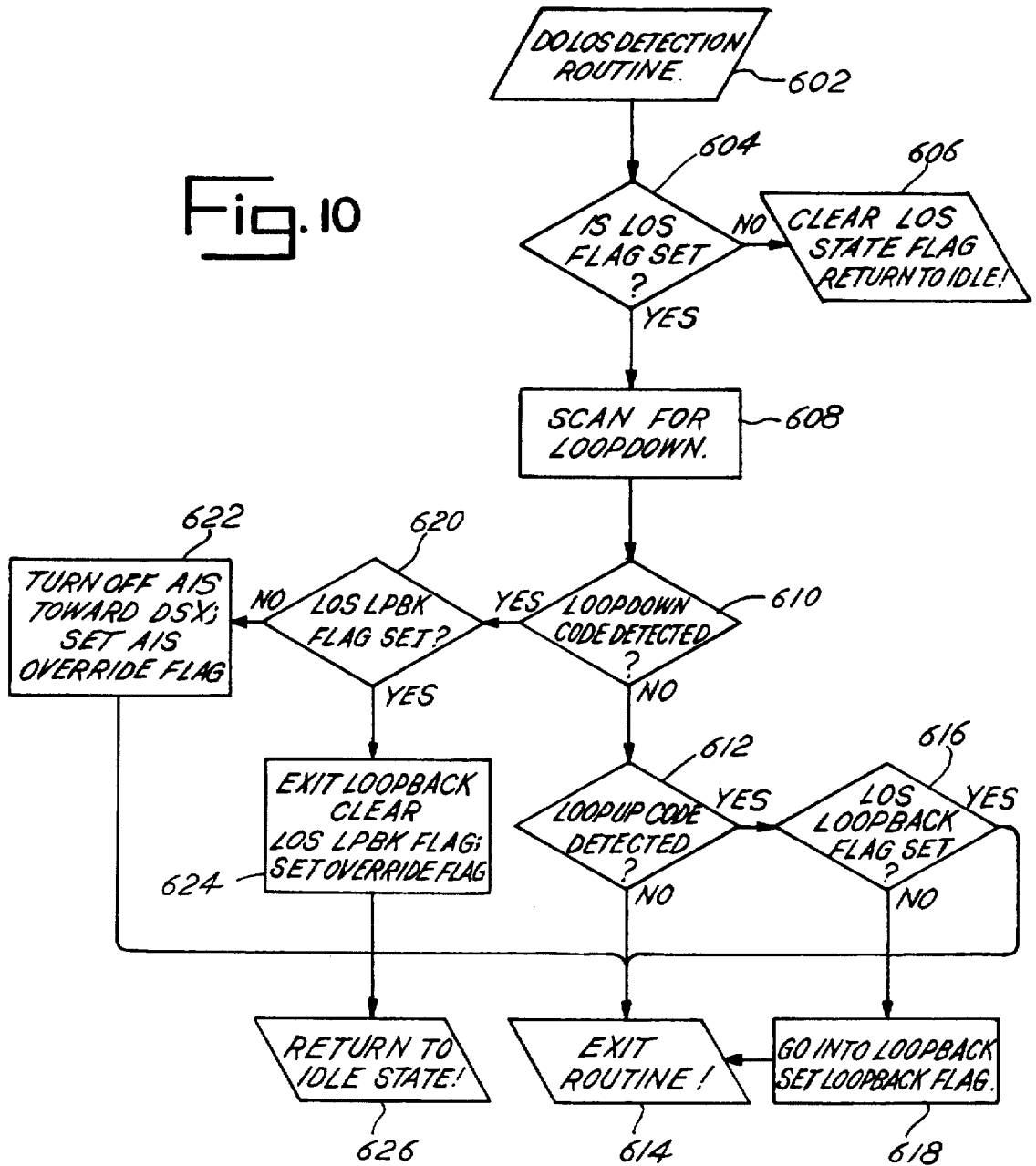
Figure 11:
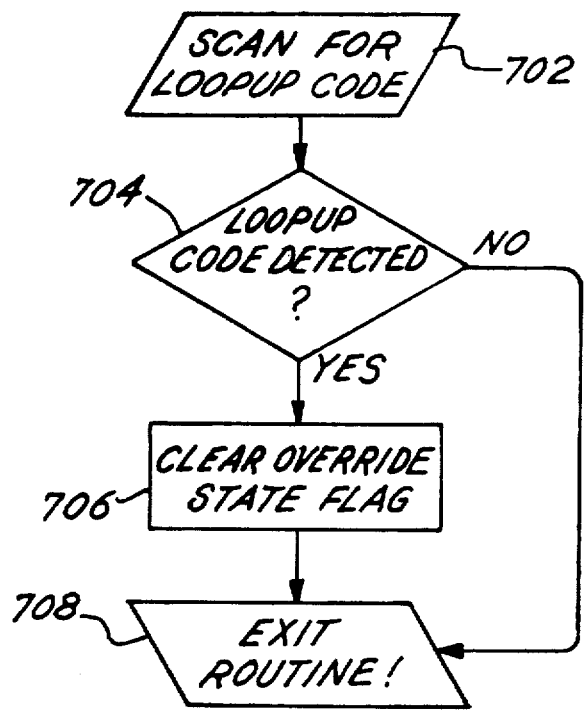
Figure 12:
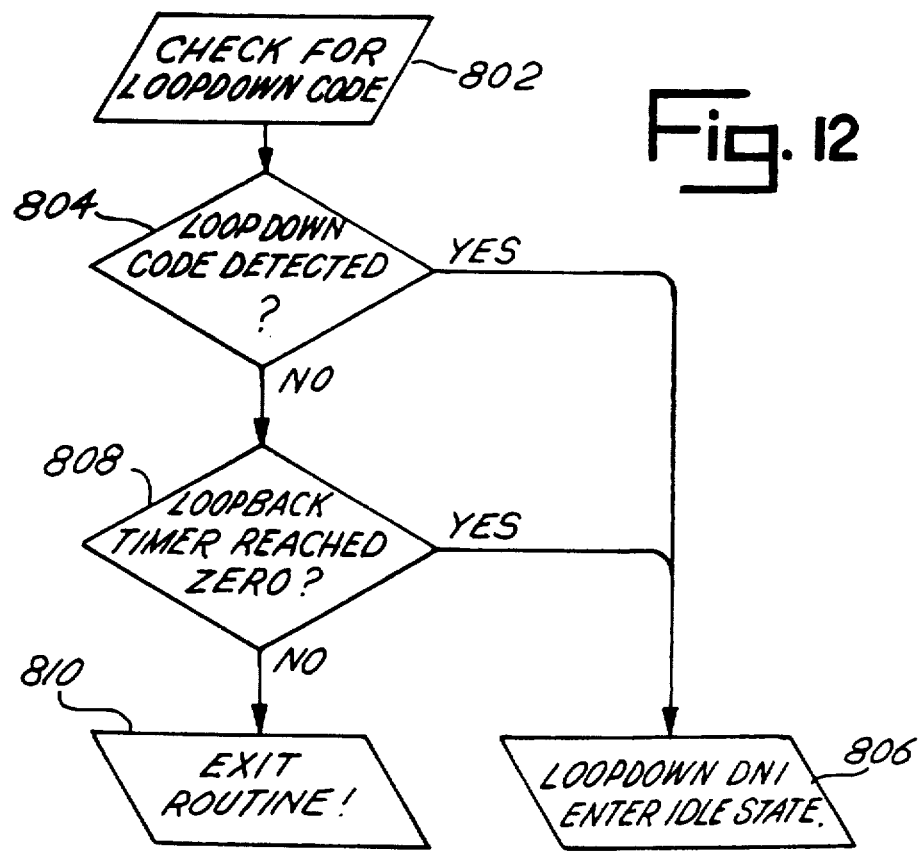

FIG. 8 is a flow chart of a Manual Loopback Mode Routine employed by the microprocessor shown in FIG. 5;

FIG. 9 is a flow chart of a Loss of Signal Detection Routine employed by the microprocessor shown in FIG. 5;

FIG. 10 is a flow chart of a Loss of Signal Routine employed by the microprocessor shown in FIG. 5;

FIG. 11 is a flow chart of an Alarm Indication Signal Override Routine employed by the microprocessor shown in FIG. 5; and FIG. 12 is a flow chart of a Loopback Routine as employed by the microprocessor shown in FIG. 5.

DETAILED DESCRIPTION OF THE PREFERRED EMBODIMENT

Figure 1:
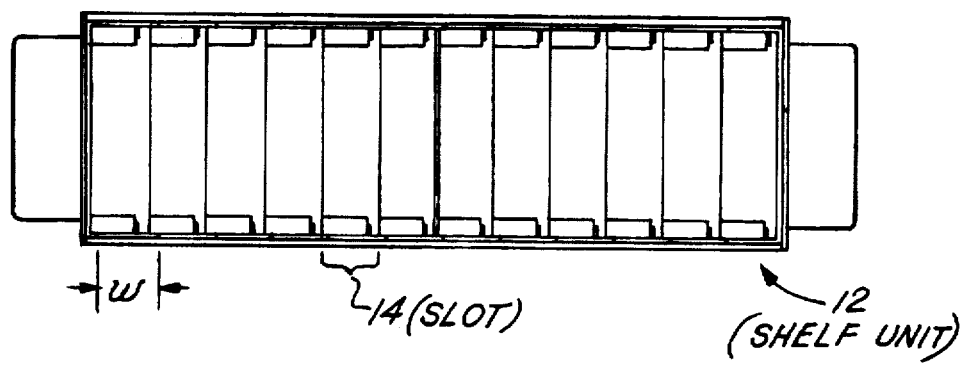
FIG. 1 is front view of a shelf unit for containing prior art network interface units.
Figure 2:
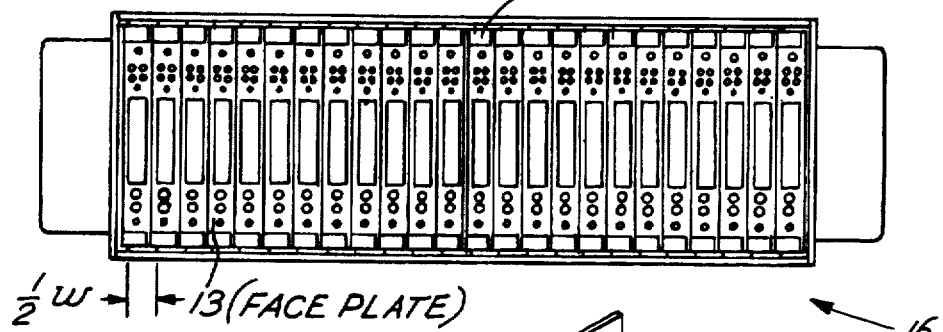
FIG. 2 is a front view of a shelf unit for containing network interface units made in accordance with the present invention.

Referring first to FIGS. 1 and 2, there is shown an advantage of the present invention, namely the reduction in required size of the network interface unit ("NIU") 10. FIG. 1 illustrates a shelf unit 12 designed to hold the prior art network interface units, in accordance with industry standards. Each slot 14 in the shelf unit of FIG. 1 is 1.433 inches wide.

FIG. 2, in contrast, illustrates a shelf unit designed to hold the network interface units made in accordance with the present invention 16. The width of an NIU made in accordance with the present invention may preferably be 0.717 inches, which is exactly half the width of the prior art NIU. Accordingly, in the span of a 17.68 inch shelf unit, the present invention allows 24 slots to hold 24 network interface units 10, whereas in the same 17.68 inch span of a shelf unit, it would only be possible to hold 12 prior art network interface units. Each NIU 10 is found on a single, multilayered printed circuit wiring board. The prior art NIUs included assemblies having two such boards mounted together in a side-by-side relationship.

Figure 3:
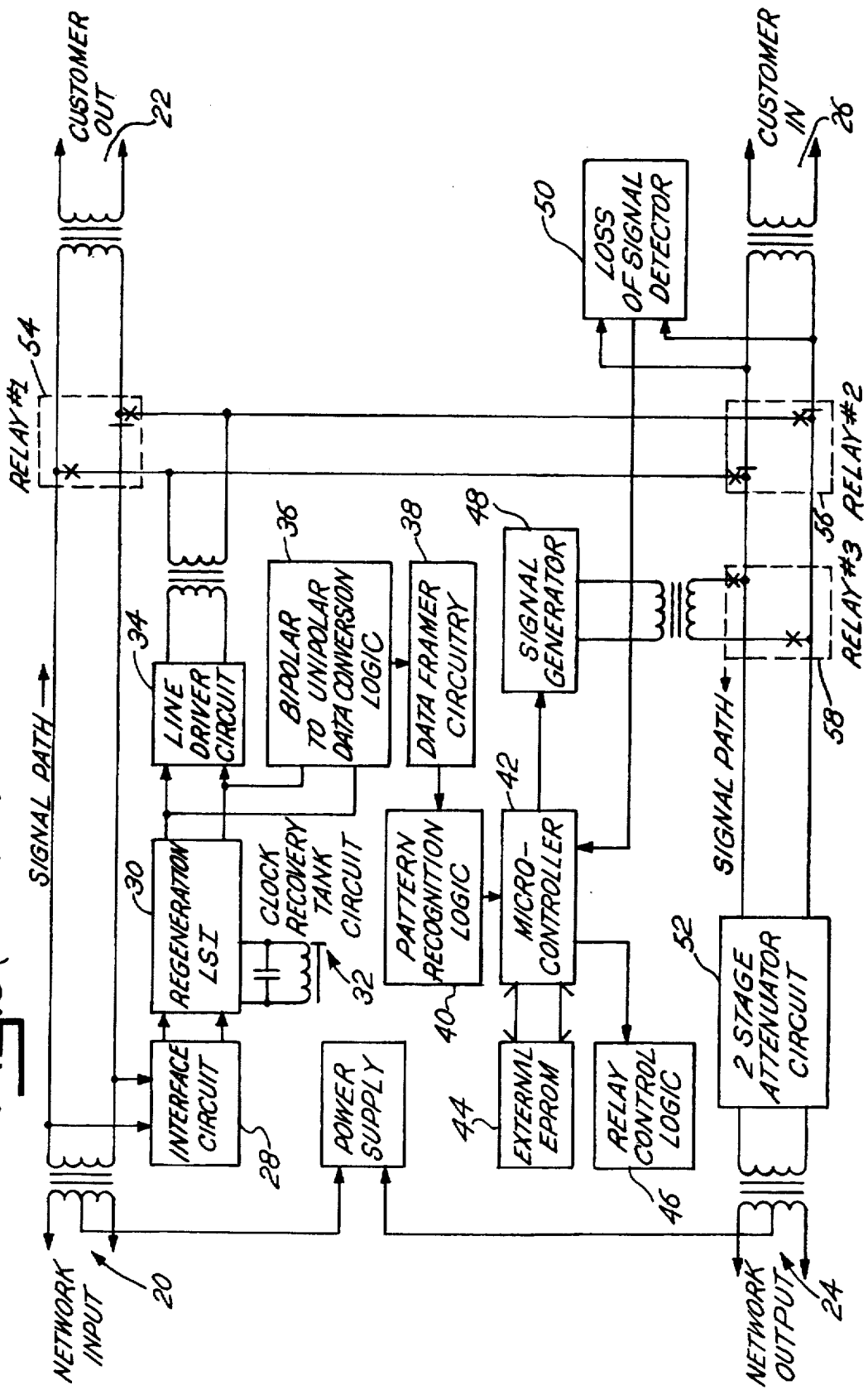
FIG. 3 is block diagram of a prior art network interface unit.

Referring now to FIG. 3, there is illustrated a prior art embodiment of a Type-400 NIU which is embodied on a dual printed circuit board device having a width of approximately 1.4 inches for mounting in a standard shelf. A payload signal in the form of a digital data stream is carried into the NIU on a pair of network input lines 20. Under normal conditions, the payload passes through a first relay 54 and then exits the NIU on customer output transmission lines 22. Thus, electrically, the NIU is transparent to a payload signal.

Inside the NIU, the payload data stream also passes to an interface circuit 28, which passes the data stream to a regeneration large scale integrated circuit 30, such as part number XR-277 manufactured by the EXAR company. The regeneration circuit 30, which must be connected to a clock recovery tank circuit 32, regenerates the data signal. The signal is then passed to a line driver circuit 34, which then passes the signal to the customer output transmission lines 22.

Interposed between the regeneration circuit 30 and the line driver circuit 34 is a bipolar to unipolar data conversion circuit 36, which converts data from bipolar coding to unipolar coding and passes the signal to data framer circuitry 38. The data framer circuity 38 detects framing patterns. From the data framer circuitry 38, the data then passes to pattern recognition logic circuitry 40, which, for instance, scans the data stream for codes sent by the central office.

A microcontroller 42, such as one manufactured by Intel Inc. as part number 80C31, receives the data stream from the pattern recognition logic circuitry 40 and communicates with an external EPROM 44. The microcontroller in turn communicates with relay control logic circuitry 46 and with signal generator circuitry 48.

Customer input transmission lines 26 enter the NIU and carry a payload that passes through a loss-of-signal detector 50 and a two-stage attenuator circuit 52. The loss-of-signal detector is connected to and communicates with the microcontroller 42. After passing through the two-stage attenuator circuit 52, the data exits the NIU on the network output transmission lines 24.

A second relay 56 is connected to the customer input transmission lines 26 subsequent to the loss-of-signal detector 50. Upon detection of a predetermined pattern in the data steam, the microcontroller 42 and relay control logic 40 may cause the first and second relays 54, 56 to turn off the customer input and output transmission paths, and to instead enter a loopback mode. In the loopback mode, the network input data stream (from the network input 20) is passed through the first and second relays 54, 56 and returned through the two-stage attenuator circuit 52 to the network output lines 24.

A third relay 58 is connected on the return transmission lines down line from the second relay 56. The signal generator 48 (which is controlled by the microcontroller 42) is connected with the third relay 58. Thus, for example, upon detection of a predetermined pattern in the data stream, the microprocessor 42 may cause the signal generator 48 to generate a specific signal that will then pass through the third relay 58, through the two-stage attenuator circuit 52, and out through the network output transmission lines 24.

Figure 4:
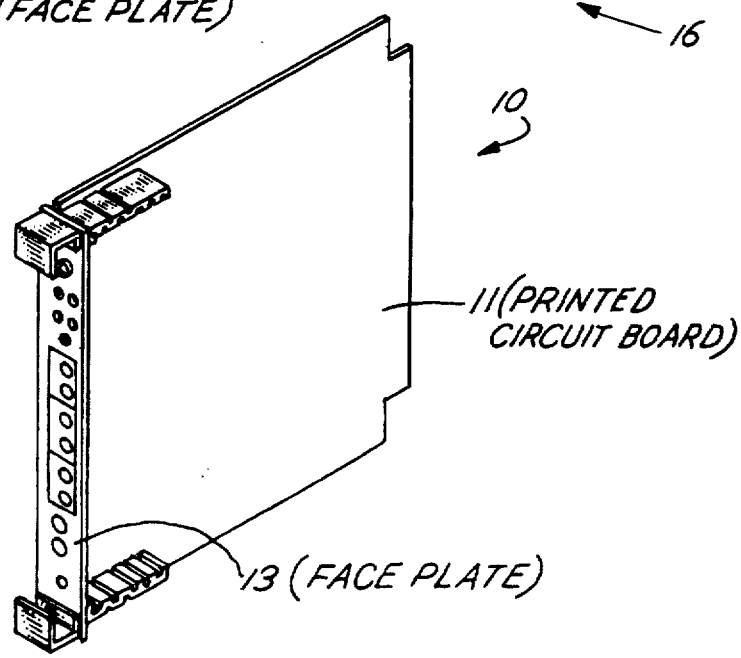
FIG. 4 is perspective view of a printed circuit board assembly embodying a network interface unit made in accordance with the present invention.

The high density network interface unit of the present invention improves over the prior art Type-400 NIU. Refer to FIGS. 4 and 5, in which a block diagram of an NIU 10 made in accordance with the present invention is illustrated. As shown in FIG. 4, the NIU 10 is substantially mounted on a single, multi-layered printed circuit board 11. In the present context, printed circuit board refers to any such substantially planar circuit board or to a combination of such boards affixed to each other in a substantially planar relationship (rather than in an adjacent surface relatonship). The board 11 measures approximately 5½ inches on each side. A face plate 13 is mounted orthoganally along one edge of the board 11.

A payload signal enters the NIU 10 on the network transmission input lines 20. These may be referred to as incoming digital telephone lines, since data comes to the customer premises through these lines. The payload may pass directly through a first relay 60 in the NIU and exit on the customer output lines 22, which may also be referred to as the incoming customer premises lines. Similarly, network output transmission lines 24 may also be referred to as outgoing digital telephone lines, and the customer input transmission lines 26 may be referred to as outgoing customer premises telephone lines.

In addition, internal to the NIU, the payload signal passes to a regeneration large scale integrated circuit 62, which is connected to a quartz crystal controlled phase locked loop ("PLL") circuit 64. In the preferred embodiment, the regeneration circuit 62 is part number LXT312 or LXT315 as manufactured by Level 1 Communications Inc. The PLL circuit 64 connected to the regeneration circuit 62 provides a means for synchronizing the clock signal on the receiving line with the internal locally generated clock. The interface circuit 28 and clock recovery tank circuit 32 of the prior art NIU are thus eliminated.

The regeneration large scale integrated circuit 62 is connected to an application specific integrated circuit ("ASIC") 66, to which the regeneration circuit 62 passes the data. The ASIC 66 of the present invention is manufactured by LSI Logic, Inc. Alternatively, a product manufactured by the Xilinx corporation, described as a "programmable gate array" (part number XC2018, XC3030 or XC3042), could be used in place of the LSI Logic ASIC.

In the preferred embodiment, the single ASIC 66 provides (i) bipolar to unipolar data conversion, (ii) data framer circuitry, (iii) pattern recognition logic, (iv) signal generation, and (v) loss of signal detection, each of which will be discussed below. The ASIC 66 integrally communicates with and cooperates with a microprocessor 68 (such as a Motorola MC68705C8 microprocessor, or, alternatively, the Intel 87C51 or the Texas Instruments TMS70C00) having an internal "one-shot" EPROM. The microprocessor 68 and ASIC 66 communicate with each other via a bus 67. The microprocessor 68 and ASIC 66 may be considered as a single, unitary controller 69. Substantial "savings" of space on the board is thus achieved by using such an ASIC-microprocessor based controller 69 to control the operation of the NIU 10.

The microprocessor 68 is also connected to relay drive circuitry 70 for controlling the first relay 60 and a second relay 72. Notably, in the prior art, the EPROM 44 was external to the microcontroller 42. By designing the EPROM to be internal to the microprocessor 68 of the present invention, the required circuit board area is reduced.

A control system is encoded on the EPROM internal to the microprocessor 68. The control system is embodied in software integrally communicating with and integrally cooperating with the ASIC 66 in order to perform various functions. Again, implementation of the control function with software or firmware in the controller 69 allows substantial savings of space on the board 11. A detailed discussion of the control system encoded in the preferred embodiment of the present invention is provided below.

As noted, the ASIC provides bipolar to unipolar conversion. Bipolar digital data is in essence an AC signal, in which every other 1 is positive and every other 1 is negative. Thus, bipolar coding provides that a logic 0 is encoded with zero voltage while a logic 1 is alternatively encoded with positive and negative voltages. The average voltage level is thereby maintained at zero in order to eliminate dc components in the signal spectrum.

A unipolar signal, in contrast, involves only positive numbers. A bipolar signal is in fact two unipolar signals, one representing positive bits and one representing negative bits, both aligned by a local clock.

As is well-known by those of ordinary skill in the art, AC signals travel better over long distances than do DC signals. Therefore, throughout the telecommunication network transmission lines, signals are transmitted in AC form. However, a microprocessor is incapable of understanding bipolar signals. Therefore, for purposes of the NIU 10, the bipolar signal must be converted into a unipolar signal prior to or upon entry to the NIU 10.

The conversion from bipolar to unipolar encoding in the preferred embodiment of the present invention is accomplished in two stages. First, the regeneration large scale integrated circuit 62 converts the positive half of the incoming bipolar signal to a first unipolar pulse and the negative half of the incoming bipolar signal to a second unipolar pulse. Next, the first and second unipolar pulses enter the ASIC 66, which passes the pulses through an OR gate, thereby producing a single unipolar (or DC) pulse representative of the payload signal. As will be discussed below, line driver circuitry then gives the resultant unipolar signal sufficient power to enable transmission of the signal in DS1 format (1.544 Mbps).

The ASIC 66 of the present invention also provides framer circuitry. In a T-1 system, every 193rd bit is a framing bit. The framer circuitry in the preferred ASIC scans the incoming data in order to find the predetermined framing pattern. The NIU may thus utilize the organized frame structure to detect or generate communication signals such as responses to maintenance or status requests.

The ASIC 66 also provides pattern recognition circuitry and signal generation circuitry. Thus, for example, the NIU is capable of scanning the incoming data stream for status requests sent by a remote line element or test set. Through its signal generation circuitry, the ASIC may independently or responsively produce communication signals in the data stream. In the preferred embodiment, the signal generation circuitry produces only high bits (1's). Examples of signals that may be generated include responsive signals sent to the central office to provide information requested by a test set, alarm indication signals ("AIS") to provide a warning signal indicating, for instance, that framing has been lost, and loopback initiation signals ("LIS"), to indicate to the central office that the NIU has entered loopback mode.

As noted above, the incoming signal path passes through a first relay 60. When the controller 69 recognizes a predetermined pattern or signal in the incoming data stream requesting a loopback, the controller 69 may cause the first relay 60 to pass the data stream to line driver hybrid circuitry 74 rather than to the customer output transmission lines. The line driver hybrid circuitry 74, in turn, passes the data to the ASIC 66. The signal may then pass through an additional line driver hybrid circuit 76, onto the outgoing signal path, through a two stage attenuator circuit 78, and out from the NIU 10 on the network output transmission lines 24.

The controller 69 may also recognize other requests, found on the lines 20-24, that the NIU 10 move into other modes of operation or provide additional information. Such information is provided along the lines 20-26 by the controller 69 in the form of a data signal. Notably, the controller 69 supplies the requested information via one of the relays 60, 67 (also used for loopback) rather than via a third separate relay. Thus, the space requirements for the board 11 are again reduced.

In many prior art NIUs, a line driver circuit utilized discrete electric components. In contrast, the line driver hybrid circuits 74, 76 in the NIU of the present invention use conductive ink resistors and surface-mounted semiconductors attached to a ceramic substrate to help reduce the circuit board area required.

Similarly, the two-stage attenuator circuit 78 in the preferred embodiment of the present invention utilizes thick film resistor networks. Such networks use a conductive ink on a ceramic substrate to replace many discrete resistor elements that would otherwise be on the board 11.

As noted above, a control system is encoded on the EPROM internal to the microprocessor 68. This control system integrally communicates with and cooperates with the ASIC 66 via the bus 67 to perform various functions. A detailed discussion of the architecture of the ASIC 66 and the programs used by the microprocessor 68 in order to perform such functions are described below.

Figure 6:
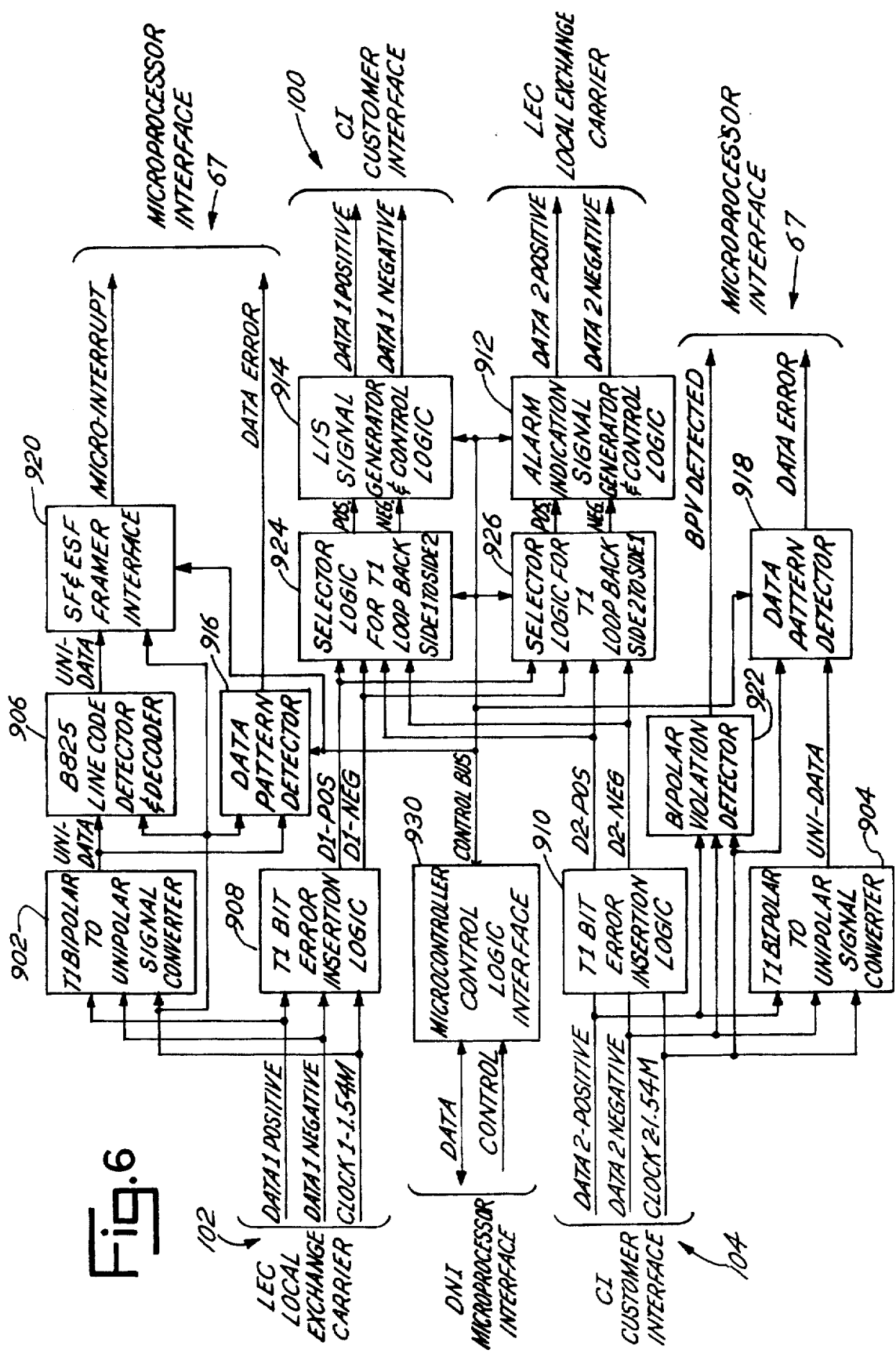
FIG. 6 is a block diagram of the application specific integrated circuit shown in FIG. 5.

FIG. 6 illustrates the architecture of the ASIC 66. As noted, the ASIC 66 provides bipolar to unipolar data conversion, shown at blocks 902-904. In addition, the ASIC 66 scans the incoming data stream to detect and decode a B8ZS line code, shown at block 906. The ASIC 66 also scans the incoming data stream, at block 920, in order to determine whether the data stream is arranged in superframing or extended superframing form.

The ASIC inserts "errors" in the data stream, according to a predetermined pattern, at blocks 908–910. The errors are introduced according to a pattern in order to communicate with external equipment, which understands that errors in the payload, following certain formats, are made by the NIU n order to communicate information.

In addition, at block 912, the ASIC 66 generates the above-discussed alarm indication ("AIS") signal, and, at block 914, the ASIC 66 generates other signals in the data stream. At blocks 916–918, the ASIC 66 detects patterns in the incoming data stream as discussed above, and, at block 922, the ASIC determines whether a violation of bipolar coding rules has taken place in the incoming data stream. At blocks 924–926, the ASIC 66 provides selector logic to maintain appropriate loopback conditions. An interface for the integral communication between the ASIC 66 and the microprocessor 68 of the present invention is shown at block 930.

Figure 7:
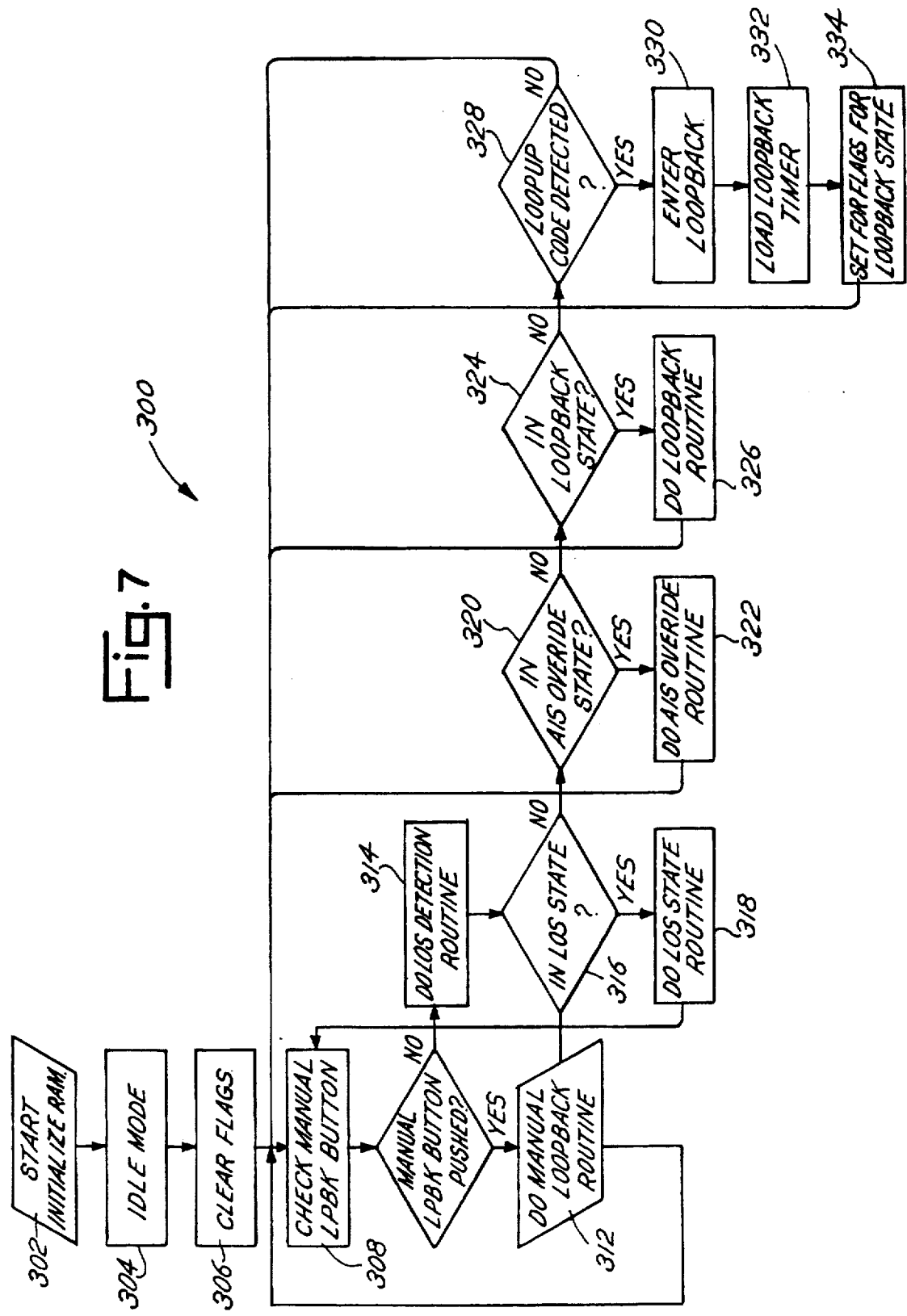
FIG. 7 is a flow chart of a Main/Idle Routine employed by the microprocessor shown in FIG. 5.

Flow charts showing a program used by the microprocessor 68 to implement the control function are shown in FIGS. 7–12. Referring first to FIG. 7, there is shown a presently preferred embodiment of a Main/Idle routine 300 employed by the microprocessor 68 of the present invention, thus embodying the present control system. The control system begins, at steps 302–306 by entering idle mode and clearing flags. In idle mode, the control system is prepared to receive predetermined signals indicating that the NIU should go into loopback mode or should respond to various states.

An NIU of the present invention may be provided with a manual button, which places the NIU in a loopback condition. Thus, at steps 308–310, the control system checks to seek whether the manual loopback button is pressed. If so, then at step 312 the control system performs the steps of a Manual Loopback Routine as illustrated in the flow chart shown in FIG. 8.

Referring to FIG. 8, at step 402, the control system is presumed to have determined that the manual loopback button has been pushed. Thus, at step 404, the control system determines whether the NIU is currently in loopback mode. If not, then the control system causes the NIU to enter loopback mode at step 406. However, if already in loopback, then at step 408, the control system determines whether the Loss of Signal ("LOS") Loopback flag is set. The LOS Loopback flag would be set if the control system had determined that no signal other than all zeros was being received by the NIU from the customer input transmission lines (i.e., from the customer side of the NIU). Had the control system detected a loss of signal, then the control system would cause the NIU to enter LOS Loopback mode, returning signals, for instance, sent to the NIU from the central office.

If, at step 408, it is determined that the LOS Loopback flag is not set, then the control system causes the NIU to exit loopback at step 410 and to return to the Main/Idle state depicted in FIG. 7. However, if, at step 408, it is determined that the LOS Loopback flag was set, then the control system needs to exit loopback mode so that, for instance, the central office may see what is happening on the other side of the NIU. Thus, at step 412, the control system exits loopback, sets an override flag to indicate that LOS Loopback has been overridden, and clears the LOS Loopback flag. The control system then returns to the Main/Idle state.

Referring again to FIG. 6, after having performed the Manual Loopback Routine at step 312, the control system then returns to an idle state beginning again at step 308. If, however, it was determined at step 310 that the manual loopback button has not been pushed, then at step 314, the control system performs a Loss of Signal Detection Routine, as illustrated by the flow chart shown in FIG. 9.

Referring to the Loss of Signal Detection Routine of FIG. 8, at steps 502–504, the control system first scans for a loss of signal on the DSX, or network, side of the NIU. A loss of signal generally consists of a signal comprising all zeros. If a loss of signal is not detected on, the DSX side of the NIU, then the DSX LOS LED is turned off at step 506. However, if a loss of signal on the DSX side is detected, then the DSX LOS LED is turned on at step 508.

Next, the control system scans for a loss of signal on the customer premises ("CPE") side of NIU at steps 510–512. If a loss of signal on the CPE side of the NIU is not detected, then the CPE LOS LED is turned off at step 514. The override flag and override state have been previously set to indicate that the NIU was in an override state, in which the NIU would not react to a loss of signal. Once the CPE LOS LED has been turned off at step 514, the control system clears the override flag and override state at step 516 so that the NIU can again react to a loss of signal.

In response to a loss of signal, the NIU of the present invention may be configured either to enter LOS Loopback mode or to begin sending an alarm indication signal ("AIS") to the DSX. The AIS is a form of data signal sent along the lines 20–26 by the controller 69. Therefore, in case a loss of signal was detected, the control system determines at step 518 whether the Loss of Signal Loopback flag is set. If the LOS Loopback flag is not set, then the NIU was configured to send an AIS to the DSX rather than to enter loopback (assuming a loss of signal was detected). Therefore, since a CPE LOS was not detected at step 512, the control system turns off the AIS towards the DSX at step 520 and exits the Loss of Signal Detection Routine at step 524. However, if the LOS Loopback flag is detected at step 518, then at steps 522–524, the control system causes the NIU to exit loopback, and the control system exits the Loss of Signal Detection Routine.

If, at step 512, a CPE LOS was detected, then the CPE LOS LED is turned on at step 526. At step 528, the control system then determines whether an optional switch on the NIU has been set for loopback. If so, then, if the override flag is set, the control system exits the Loss of Signal Detection Routine at step 524, but if the override flag is not set, the control system first enters loopback and sets the Loss of Signal Loopback flag at step 532, and then exits the Loss of Signal Detection Routine at step 524. However, if the control system determines that the optional switch for loopback is not set, then at step 534 the control system determines whether the NIU is in an override state. If so, then the control system exits the Loss of Signal Detection Routine at step 524. If not, however, then at step 536 the control system sends an alarm indication signal toward the DSX at step 536 and then exits the Loss of Signal Detection Routine at step 524.

Referring once again to the Main/Idle Routine shown in FIG. 7, after having performed the Loss of Signal Detection Routine at step 314, the control system determines whether the NIU is in a loss of signal state (that the NIU has determined that the payload is an extended periods of zeros) at step 316. If so, then at step 318 the control system performs a Loss of Signal State Routine as illustrated by the flow chart shown in FIG. 9.

Thus, referring now to FIG. 10, at step 602, the control system first ensures that a loss of signal has been detected, by repeating the Loss of Signal Detection Routine shown in FIG. 8. Next, at step 604, the control system determines whether the Loss of Signal flag is set. If the loss of signal flag is not set, then the loss of signal no longer exists; therefore, at step 606, the control system clears the Loss of Signal State flag and returns to the idle state at step 308 shown in FIG. 7. However, if the loss of signal flag is set, then, at steps 608–610, the control system scans for a loopdown code.

The control system must determine whether the NIU is in Loss of Signal Loopback mode (pursuant to an optional configuration in which the NIU responds to loss of signal by entering LOS Loopback), or rather whether the NIU is sending an AIS to the DSX (pursuant to an optional configuration in which the NIU responds to a loss of signal by sending an AIS to the DSX). Thus, if a loopdown code is not detected at step 610, then, at step 612, the control system must determine whether the NIU is receiving a loop-up code (because the NIU might be sending an AIS rather than being in LOS Loopback). If a loop-up code is not detected, then the control system exits the Loss of Signal State Routine at step 614. However, if a loop-up code is detected at step 612, then if the Loss of Signal Loopback flag is set, the control system exits the Loss of Signal State Routine at step 614, but if the Loss of Signal Loopback flag is not set, then, at steps 618 and 614, the control system causes the NIU to enter loopback and sets the loopback flag and exits the Loss of Signal State Routine.

If, however, a loopdown code is detected at step 610, then, at step 620, the control system determines whether the Loss of Signal Loopback flag is set. If the Loss of Signal Loopback flag is not set, then at step 622, the control system has the capability to turn off the AIS and sets the AIS override flag to indicate that the AIS has been overridden. If, however, the Loss of Signal Loopback flag is set, then, at step 624, the control system exits loopback, clears the Loss of Signal Loopback flag, and sets the override flag to indicate that Loss of Signal Loopback has been overridden. At step 626, the control system then returns to idle state at step 308 of the Main/Idle routine shown in FIG. 7.

Returning to FIG. 7, after having performed the Loss of Signal State Routine, the control system returns to idle mode at step 308. If, however, it was determined at step 316 that the NIU was not in a Loss of Signal State, then, at step 320, the control system determines whether the NIU is in an AIS Override state. An AIS Override state would exist where the NIU had been sending all 1's to the DSX but was stopped so that the DSX could see what was happening on the CPE side of the NIU. If the NIU is in an AIS Override state, then, at step 322, the control system performs the steps of an AIS Override State Routine as illustrated by the flow chart shown in FIG. 10.

Referring to FIG. 11, at steps 702–704, the control system scans the data stream for a loop-up code. If the control system detects a loop-up code, then it must exit override; thus, at step 706, the control system clears the override state flag. The control system then exits the AIS Override Routine at step 708.

Referring again to FIG. 6, after the AIS Override Routine is performed at step 322, the control system returns to idle state at step 308. If, however, the control system determined at step 320 that the NIU is not in an AIS Override State, then, at step 324, the control system determines whether the NIU is in Loopback state. If the NIU is in Loopback state, then, at 326, the control system performs the steps of a Loopback Routine as illustrated by the flowchart shown in FIG. 12.

Turning to FIG. 12, at steps 802–804, the control system checks for a loopdown code. If a loopdown code is detected, then, at step 806, the control system causes the NIU to exit loopback, and the control system returns to idle state at step 308 shown in FIG. 6. However, if a loopdown code is not detected, then, at step 808, the control system determines whether the optional loopback timer has reached zero. If the loopback timer has reached zero, then the control system causes the NIU to exit loopback, and the control system returns to idle stat at step 308 shown in FIG. 7. However, if the loopback timer has not expired, then the control system exits the Loopback Routine at step 810.

Returning once again to the Main/Idle Routine illustrated by the flow chart shown in FIG. 7, after performing the Loopback Routine at step 326, the control system returns to an idle state at step 308. However, if the control system determined at step 324 that the NIU is not in a Loopback State, then, at step 328, the control system determines whether a loop-up code is detected. If loop-up code is detected, then, at steps 330–334, the control system enters loopback, loads the loopback timer and sets flags for Loopback State. The control system then returns to an idle state at step 308.

In addition to the above-discussed routines as illustrated by the flow charts shown in FIGS. 7–12, the microprocessor 68 of the present invention preferably includes the following routines:

| | |
|---|---|
| DEBOUNCE.S | This routine looks at a switch line to determine whether it changes state. |
| DEFINE.S | This routine sets flags used by other routines. |
| EQU.S | This routine prepares the random access memory (RAM) that is used in the microprocessor 68. |
| EAF_SUBS.S | This routine serves two purposes. First, this routine detects ESF (Extended Superframe) framing within the data stream coming from the span. If ESF is detected, then an LED is turned on, and data link bits are gathered from the framing bits. Second, this routine determines whether the data link message is a command. In particular, in the preferred embodiment, the control system looks for two commands, the ESF Loop-up and the ESF Loopdown commands. If either of these commands are detected by this routine, then appropriate flags are set, which are relied upon by loop-up and loopdown scan routines. |
| INT.S | This is a timed interrupt routine, which ensures that the microprocessor 68 continues running and which keeps track of all software timers and counters used in the various routines in the microprocessor 68. In addition, this routine flashes a Loopback LED when the system is in a timed loopback. |
| LPBK_TBL.S | This is a table used to determine whether a valid ESF Data Link command was read. |
| MAIN_SUB.S | This is a compilation of routines, each cooperating with other routines performed by the control system. Included in this routine are: (i) scan routines that determine the number of errors detected when scanning for a given pattern; (ii) office loopback routine that throws the relays and set the ASIC for loopback; (iii) office off routine that turns off the relays and returns the gate array to normal state; (iv) loading routines that load the gate array with the 16 bit pattern sought to be recognized by the scanning routine; (v) subroutines to delay or set timers which are used throughout the control system; and (vi) serial output routine that writes the control registers to the gate array. |
| OFFICFAC.S | This file contains the routines to scan for loop-up or loopdown codes. In addition, these routines check the flags for ESF (DL) loop-up or ESF (DL) loopdown. |
| SETUP.S | This routine prepares the main registers for the microprocessor 68, clears the RAM and initializes various control registers and flags. |

As suggested above, the microprocessor 68 and ASIC 66 integrally communicate and cooperate to control the functions of the NIU. This integral cooperation is illustrated by the framing system. The microprocessor 68 and gate array are connected at three lines that are used for framing, namely the CLK_INHIBIT, the IRQ, and the ESF_DATA. The IRQ line is an interrupt line that is toggled by the gate array every 125 microseconds, which is the time that it takes 193 bits (a single frame) to enter the gate array. The CLK_INHIBIT line is driven from the microprocessor 68. When the CLK_INHIBIT line is toggled, it causes the gate array to slip one bit. The ESF_DATA line informs the processor of the state of the bit currently being examined.

If the data is not framed, then the processor will apply an algorithm to the input data to frame up the unit to ESF. In particular, the control system collects eight bits from the input line. These eight bits are 193 bits apart and are read each time the IRQ line is toggled. The algorithm separates the eight bits into four groups of two bits. These groups are then compared to incoming data in order to determine whether they match the ESF framing pattern.

If all of the groups of bits do not match the ESF framing pattern, then the CLK_INHIBIT line is toggled and it starts over again. If one of the groups fits the ESF framing pattern, the algorithm will continue comparing the incoming data for the groups until 24 bits match the framing pattern. When this occurs, the ESF_FRAME_UP bit is set to indicate that ESF data is currently being received.

When the unit is receiving ESF data, it checks input data to stay within $10^{**}(-3)$ error rate. If two consecutive frame bits are in error or four consecutive frames are in error, then the unit deems that the data is unframed.

Although the foregoing description of the preferred embodiment will enable a person of ordinary skill in the art to make and use the invention, the following detailed assembly language listing is included below. The listing provides detailed information concerning the programming and operation of the overall system. Additional detailed features of the system will become apparent to those skilled in the art from reviewing the program.

A preferred embodiment of the present invention has been described herein. It is to be understood, of course, that changes and modifications may be made in the embodiments shown without departing from the true scope and spirit of the present invention, as defined by the appended claims.

We claim:

1. A high density network interface unit for interconnecting incoming and outgoing network lines with incoming and outgoing customer premises lines, comprising, in combination:

a single, planar circuit board assembly interconnected to said network lines and customer premises lines; and a controller mounted on said circuit board assembly, including a microprocessor and an ASIC, for (i) monitoring data along said lines, (ii) recognizing a loopup command signal and responsively entering a loopback mode, and (iii) recognizing a loopdown command signal and responsively exiting said loopback mode.

2. A network interface unit for interconnecting network telephone lines and customer premises telephone lines, said network interface unit measuring less than 1 inch in width and comprising, in combination:

a single, planar circuit board assembly interconnected to network input lines, to network output lines, to customer premises input lines and to customer premises output lines, said network interface unit being operable to receive a signal from said network input lines, to receive a signal from said customer premises input lines, to provide a signal to said network output lines and to provide a signal to said customer premises output lines;

a first relay mounted on said single, planar circuit board assembly and interconnected to said network input lines and to said customer premises output lines;

a second relay mounted on said single, planar circuit board assembly and interconnected to said customer premises input lines and to said network output lines; and a controller mounted on said single, planar circuit board assembly and having both an application specific integrated circuit and a processor, for (i) converting bipolar signals on said network input lines to unipolar signals, (ii) monitoring data along said lines, (iii) recognizing a predetermined loopback signal and responsively activating both said first relay and said second relay to cooperatively interconnect said network input lines with said network output lines, and (iv) recognizing frames of data received from said network input lines.

3. A network interface unit as claimed in claim 2 having a width of less than 0.9 inches.

4. A network interface unit as claimed in claim 3, further comprising a face plate mounted orthogonally along an edge of said single, planar circuit board assembly, wherein said face plate defines said width of said network interface unit.

5. A network interface unit as claimed in claim 3 having a width of less than 0.8 inches.

6. A network interface unit as claimed in claim 5, further comprising a face plate mounted orthogonally along an edge of said single, planar circuit board assembly, wherein said face plate defines said width of said network interface unit.

7. A network interface unit as claimed in claim 5 having a width of less than 0.72 inches.

8. A network interface unit as claimed in claim 7, further comprising a face plate mounted orthogonally along an edge of said single, planar circuit board assembly, wherein said face plate defines said width of said network interface unit.

9. A network interface unit as claimed in claim 5 having a width of 0.717 inches.

10. A network interface unit as claimed in claim 9, further comprising a face plate mounted orthogonally along an edge of said single, planar circuit board assembly, wherein said face plate defines said width of said network interface unit.

11. A network interface unit as claimed in claim 2, further comprising a face plate mounted orthogonally along an edge of said single, planar circuit board assembly, said face plate defining a width of said network interface unit, said width being only half that of a Type-400 network interface unit.

12. A network interface unit as claimed in claim 2 having a height of approximately 5.6 inches and a length of approximately 5.9 inches.

13. A network interface unit as claimed in claim 2, wherein said single, planar circuit board assembly measure approximately 5.5 inches in width and in length.

14. A network interface unit as claimed in claim 2, wherein said processor internally includes an EPROM storing a control system integrally communicating with and cooperating with said application specific integrated circuit.

15. A network interface unit as claimed in claim 2, wherein said controller further provides a data signal along said network output lines.

16. A network interface unit as claimed in claim 15, wherein said controller provides said data signal along said network output lines by providing said data signal to one of said relays.

17. A network interface unit as claimed in claim 2, further providing an alarm indication signal along said network output lines in response to a loss of signal on said customer premises input lines.

18. A network interface unit as claimed in claim 2, wherein said network interface unit enters loopback in response to a loss of signal on said customer premises input lines.

19. A network interface unit as claimed in claim 2, wherein said application specific integrated circuit includes bipolar to unipolar data conversion circuitry, framer circuitry, and pattern recognition circuitry.

20. A network interface unit as claimed in claim 19, wherein said application specific integrated circuit further includes data signal generation circuitry.

21. A network interface unit for interconnecting network telephone lines and customer premises telephone lines, said network interface unit having a width of less than 0.8 inch, and having a height and length corresponding to a Type-400 NIU, said network interface unit comprising, in combination:

a single, planar circuit board assembly interconnected to network input lines, to network output lines, to customer premises input lines and to customer premises output lines, said network interface unit being operable to receive a signal from said network input lines, to receive a signal from said customer premises input lines, to provide a signal to said network output lines and to provide a signal to said customer premises output lines;

a face plate mounted orthogonally along an edge of said single, planar circuit board assembly, wherein said face plate defines said width of said network interface unit;

a first relay mounted on said single, planar circuit board assembly and interconnected to said network input lines and to said customer premises output lines;

a second relay mounted on said single, planar circuit board assembly and interconnected to said customer premises input lines and to said network output lines; and a controller mounted on said single, planar circuit board assembly and having both an application specific integrated circuit and a processor, for (i) converting bipolar signals on said network input lines to unipolar signals, (ii) monitoring data along said lines, (iii) recognizing a predetermined loopback signal and responsively activating both said first relay and said second relay to cooperatively interconnect said network input lines with said network output lines, and (iv) recognizing frames of data received from said network input lines.

22. A network interface unit as claimed in claim 21, wherein said network interface unit passes a signal from said network input lines to said customer premises output lines, and wherein said network interface unit passes a signal from said customer premises input lines to said network output lines.

23. A network interface unit as claimed in claim 22, wherein said controller generates a data signal and provides said data signal along said network output lines.

24. A network interface unit as claimed in claim 23, wherein said controller provides said data signal along said network output lines by providing said data signal to one of said relays.

25. A network interface unit as claimed in claim 23, wherein said data signal comprises an alarm indication signal.

* * * * *